US008725417B1

(12) United States Patent
Young et al.

(10) Patent No.: US 8,725,417 B1
(45) Date of Patent: May 13, 2014

(54) RAPID INTERVISIBILITY DETERMINATION IN RESOURCE-CONSTRAINED COMPUTATIONAL ENVIRONMENTS

(75) Inventors: Shih-Yih Young, Marion, IA (US); Kristen M. Jerome, Monticello, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 813 days.

(21) Appl. No.: 12/870,335

(22) Filed: Aug. 27, 2010

(51) Int. Cl.
*G01C 21/34* (2006.01)

(52) U.S. Cl.
USPC .......... 701/533; 701/528

(58) Field of Classification Search
USPC .......... 701/533, 528
See application file for complete search history.

(56) References Cited

U.S. PATENT DOCUMENTS

2001/0023390 A1 * 9/2001 Gia .......... 701/301

OTHER PUBLICATIONS

"Performance Specification Digital Terrain Elevation Data (DTED)", National Imagery and Mapping Agency, Department of Defense, MIL-PRF-89020B, May 23, 2000.

Young, Ryan S.Y., "Long-Range, In-Flight 3D Trajectory Re-Planning with Airborne E*"; Proceedings of Institute of Navigation National Technical Meeting, San Diego, CA, Jan. 28-30, 2008.

Bhattacharya, Parthajit, "Efficient Neighbor Finding Algorithms in Quadtree and Octree"; Master Thesis, Indian Institute of Technology, Nov. 2001.

Frisken, Sarah F., et al., "Simple and Efficient Traversal Methods for Quadtrees and Octrees"; Mitsubishi Electric Research Laboratories, Cambridge, MA, Nov. 2002.

Tu, Tiankai, et al., "The Etree Library: A System for Manipulating Large Octrees on Disk"; Carnegie Mellon University, Pittsburgh, PA, Jul. 2003.

Knoll, Aaron, et al., "Interactive Isosurface Ray Tracing of Large Octree Volumes", SCI Institute, University of Utah, Technical Report No. UUSCI-2006-026, 2006.

* cited by examiner

*Primary Examiner* — Ramsey Refai
(74) *Attorney, Agent, or Firm* — Donna P. Suchy; Daniel M. Barbieri

(57) ABSTRACT

The present invention is a method for providing rapid intervisibility determination in resource-constrained computational environments. The method may be applied to various real-time applications, such as real-time flight planning and ad-hoc network management. The method includes pre-processing terrain elevation data into an ELDETREE data structure, which uses a 3-D grid coordinate system for each zone inside a multi-zone planning area, for expediting intervisibility determination. Along with promoting increased intervisibility computation efficiency, the method further promotes reduced memory usage for intervisibility computation.

13 Claims, 10 Drawing Sheets

| Direction\Location | NW | NE | SW | SE |
|---|---|---|---|---|
| North | True | True | False | False |
| West | True | False | True | False |
| East | False | True | False | True |
| South | False | False | True | True |

Neighbor Presence Table

| Bit Code\Direction $\emptyset(b_m, D)$ | N | W | E | S |
|---|---|---|---|---|
| 00 | 10 | 01 | 01 | 10 |
| 01 | 11 | 00 | 00 | 11 |
| 10 | 00 | 11 | 11 | 00 |
| 11 | 01 | 10 | 10 | 01 |

*FIG. 4C*

| Bit Code\Direction $\Gamma(b_m, L)$ | NW (00) | NE (01) | SW (10) | SE (11) |
|---|---|---|---|---|
| 00 | C | North | West | S |
| 01 | North | C | S | East |
| 10 | West | S | C | South |
| 11 | S | East | South | C |

*FIG. 4D*

RAPID INTERVISIBILITY DETERMINATION IN RESOURCE-CONSTRAINED COMPUTATIONAL ENVIRONMENTS

FIELD OF THE INVENTION

The present invention relates to airborne computing platforms and particularly to a method for providing rapid intervisibility determination in resource-constrained computational environments.

BACKGROUND OF THE INVENTION

Rapid determination of intervisibility between two locations based on Digital Terrain Elevation Data (DTED) is needed for many applications, such as ad-hoc networking and real-time flight planning. These applications may need intervisibility determination for different reasons. For example, to have a robust communication between two nodes in an ad-hoc networking environment, a clear Line-Of-Sight (LOS) between these two nodes is needed. Since there may be many communication nodes (ex. —200 nodes) in an ad-hoc network, it is critical to determine intervisibility rapidly between these many nodes so messages can be transmitted reliably from the starting node to its remote destination node by jumping through many intermediate nodes. For the real-time flight planning applications, it is essential to plan a safe and shorter path for threat avoidance by ensuring there is no intervisibility between the modified flight path and threats, especially when the flight path penetrates through threat zones. In other words, a safe and shorter path can be constructed by hiding behind terrain so that threats cannot see the aircraft, even when the aircraft is within threat zones.

Intervisibility computation with DTED terrain files is a time-consuming process, especially when many intervisibility computations (ex. —100,000 computations) are needed to construct a safe and terrain-masked path. Therefore, applications requiring extensive intervisibility computations are currently performed on ground facilities that have access to fast computational devices, since airborne platforms usually lack the required computational resources to perform many intervisibility computations in a very short period of time required to support mission objectives.

However, many airborne applications are starting to demand the capability of rapid intervisibility computations so that locations of communication nodes may be adjusted or flight paths may be re-planned in-flight to take into account real-time unforeseen events. Current intervisibility algorithms may not operate efficiently in resource-constrained airborne platforms.

Thus, it would be desirable to provide a method for rapid intervisibility determination which implements an algorithm which performs efficiently in resource-constrained computational environments and obviates problems associated with current solutions.

SUMMARY OF THE INVENTION

Accordingly, an embodiment of the present invention is directed to a method for providing rapid intervisibility determination, including: receiving an active flight plan; creating a terrain pre-processing area based on the active flight plan; determining geodetic coordinates of the terrain pre-processing area; querying and retrieving terrain elevation data (ex. —Digital Terrain Elevation Data (DTED) files) from an on-board database based on said geodetic coordinates of the terrain pre-processing area; processing the DTED files into a data structure; assigning the terrain pre-processing area and the data structure as an active planning area; dividing the active planning area into multiple, uniformly-sized zones in geodetic coordinates; processing the DTED files of the active planning area and storing said DTED files in a two-dimensional (2-D) grid coordinate system via an Ellipsoidal Transverse Mercator (ETM) projection; computing a Line-Of-Sight (LOS) vector between a first location and a second location in Earth-Centered, Earth-Fixed (ECEF) coordinates, the first location being a start location for the vector, the second location being an end location for the vector; converting an ECEF position of the first location to geodetic coordinates; comparing the geodetic coordinates of the first location to geodetic coordinates of boundaries of at least one of the multiple zones to determine which of the multiple zones the first location is located within, the zone in which the first location is determined as being located within being a first zone; converting an ECEF position of the second location to geodetic coordinates; comparing the geodetic coordinates of the second location to geodetic coordinates of boundaries of at least one of the multiple zones to determine which of the multiple zones the second location is located within, the zone in which the second location is determined as being located within being a second zone; identifying a first line segment of the LOS vector, said first line segment spanning from the first location to a third location on the LOS vector, the third location being located between the first location and the second location, the third location being located on the LOS vector (ex. —on the first line segment), the third location being at an intercept point for the LOS vector and a boundary of a three-dimensional volume of the first zone, the first line segment being located within the first zone; identifying a second line segment of the LOS vector, said second line segment spanning from the third location to the second location on the LOS vector, the second line segment being located within the second zone; comparing the first line segment with DTED files of the first zone to determine intervisibility of the first line segment, said first line segment occupying a three-dimensional grid coordinate system of the first zone, said DTED files of the first zone being stored in the three-dimensional grid coordinate system of the first zone; comparing the second line segment with DTED files of the second zone to determine intervisibility of the second line segment, said second line segment occupying a three-dimensional grid coordinate system of the second zone, said DTED files of the second zone being stored in the three-dimensional grid coordinate system of the second zone; and when said first line segment and said second line segment are each determined as being intervisible based upon said comparisons, identifying the LOS vector as being intervisible.

An additional embodiment of the present invention is directed to a computer program product, including: a non-transitory signal-bearing medium bearing one or more instructions for performing a method for providing rapid intervisibility determination, said method including: receiving an active flight plan; creating a terrain pre-processing area based on the active flight plan; determining geodetic coordinates of the terrain pre-processing area; querying and retrieving terrain elevation data (ex. —Digital Terrain Elevation Data (DTED) files) from an on-board database based on said geodetic coordinates of the terrain pre-processing area; processing the DTED files into a data structure; assigning the terrain pre-processing area and the data structure as an active planning area; dividing the active planning area into multiple, uniformly-sized zones in geodetic coordinates; processing the DTED files of the active planning area and storing said DTED files in a two-dimensional (2-D) grid coordinate system via an Ellipsoidal Transverse Mercator (ETM) projection; computing a Line-Of-Sight (LOS) vector between a first location and a second location in Earth-Centered, Earth-Fixed (ECEF) coordinates, the first location being a start location for the vector, the second location being an end location for the vector; converting an ECEF position of the first location to geodetic coordinates; comparing the geodetic coordinates of the first location to geodetic coordinates of boundaries of at least one of the multiple zones to determine which of the multiple zones the first location is located within, the zone in which the first location is determined as being located within being a first zone; converting an ECEF position of the second location to geodetic coordinates; comparing the geodetic coordinates of the second location to geodetic coordinates of boundaries of at least one of the multiple zones to determine which of the multiple zones the second location is located within, the zone in which the second location is determined as being located within being a second zone; identifying a first line segment of the LOS vector, said first line segment spanning from the first location to a third location on the LOS vector, the third location being located between the first location and the second location, the third location being located on the LOS vector (ex. —on the first line segment), the third location being at an intercept point for the LOS vector and a boundary of a three-dimensional volume of the first zone, the first line segment being located within the first zone; identifying a second line segment of the LOS vector, said second line segment spanning from the third location to the second location on the LOS vector, the second line segment being located within the second zone; comparing the first line segment with DTED files of the first zone to determine intervisibility of the first line segment, said first line segment occupying a three-dimensional grid coordinate system of the first zone, said DTED files of the first zone being stored in the three-dimensional grid coordinate system of the first zone; comparing the second line segment with DTED files of the second zone to determine intervisibility of the second line segment, said second line segment occupying a three-dimensional grid coordinate system of the second zone, said DTED files of the second zone being stored in the three-dimensional grid coordinate system of the second zone; and when said first line segment and said second line segment are each determined as being intervisible based upon said comparisons, identifying the LOS vector as being intervisible.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 4C is a representation of a neighbor index table in accordance with an exemplary embodiment of the present invention;

FIG. 4D is a representation of a vertex neighbor index table in accordance with an exemplary embodiment of the present invention;

DETAILED DESCRIPTION OF THE INVENTION

Figure 1:
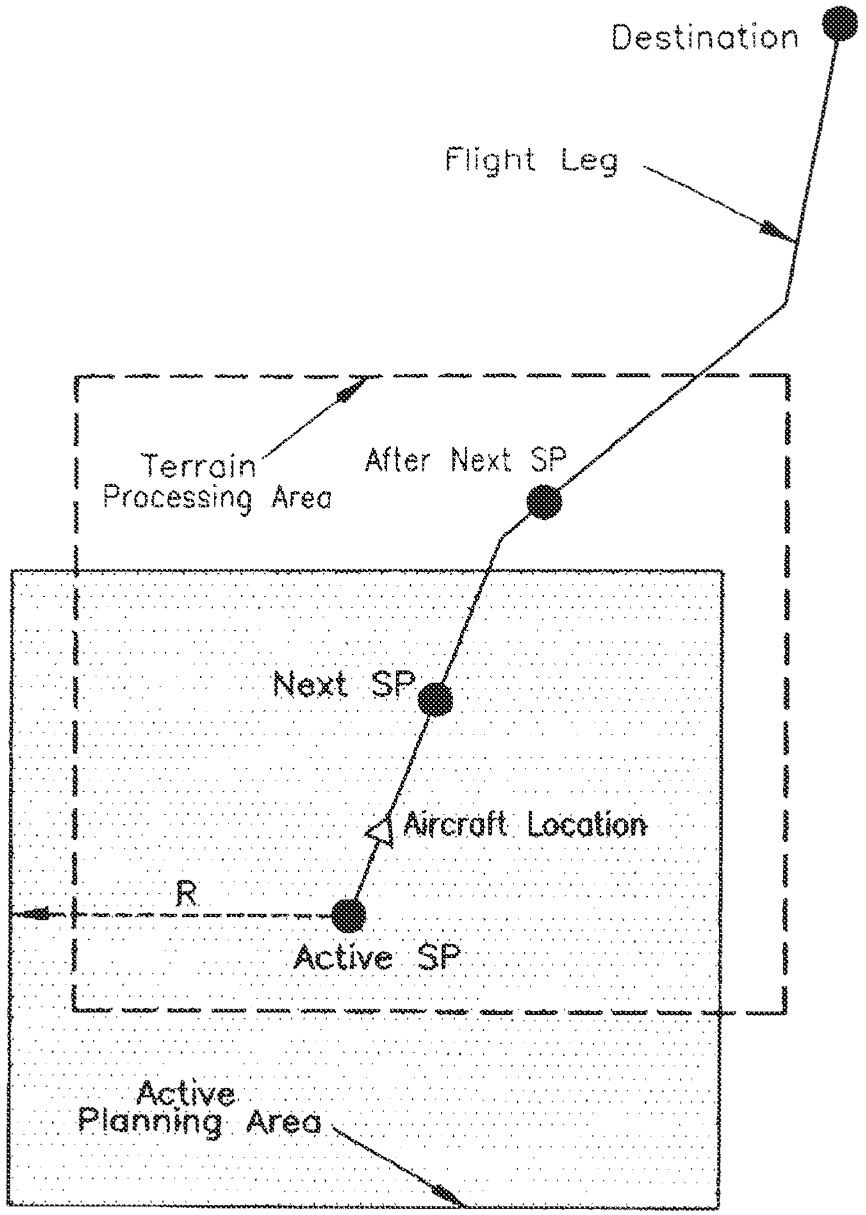
FIG. 1 is a conceptual illustration of the relationship between active SP, next SP (i.e., the succeeding SP of the active SP), active planning area, terrain pre-processing area, and a flight plan in accordance with an exemplary embodiment of the present invention.

Reference will now be made in detail to the presently preferred embodiments of the invention, examples of which are illustrated in the accompanying drawings.

The intervisibility algorithm of the present invention is specifically designed to operate very efficiently in resource-constrained computational environments that have limited computational resources that need to be shared between many applications. Specific steps may be taken by the algorithm of the present invention to increase computational speed for intervisibility determination, while reducing the required onboard memory and eliminating the use of graphics processing cards for intervisibility computations. In the embodiments disclosed herein, a real-time flight path re-planning application is used as an example to illustrate development of the method steps performed by said algorithm of the present invention. However, the algorithm of the present invention may be applicable to various other applications, such as ad-hoc communication networks.

For aircraft capable of flying very long ranges (ex. —3000 nautical miles (nmi)), it may be impractical to store Digital Terrain Elevation Data (DTED) data that covers an entire flight plan within each individual application module of an airborne computing system. In practice, global DTED data may be stored in an onboard server which may be queried by multiple application modules. Since it is unknown when unforeseen events will happen, DTED data files for a certain planning area may need to be retrieved from the onboard server to prepare for the pop-up (exs. —suddenly arising, unexpectedly arising) need to determine intervisibility between two given locations. However, retrieving and processing DTED data files from an onboard server for a large path re-planning area (ex. —200 nmi by 200 nmi) may be a time-consuming process.

For real-time threat avoidance, rapid flight path re-planning to construct a terrain-masked path is critical for the survival of the aircraft. Therefore, it may be beneficial to pre-process (ex. —retrieve and process prior to a pop-up threat occurring) terrain data surrounding the flight path via a path re-planning software module in order to significantly reduce the computational time required for path re-planning. If said data is pre-processed, when an aircraft encounters pop-up threats, there would be no need for the path re-planning software module to query terrain data files, since said terrain data files would have already been retrieved and pre-processed.

In exemplary embodiments of the present invention, method steps may be performed which may allow for generating of a terrain-masked and collision-free 4-dimensional (4-D) trajectory for an aircraft based on DTED, thereby allowing the aircraft to avoid pop-up threats. As mentioned above, by pre-processing terrain data for the path via an onboard path re-planning software module (ex. —Airborne E*), the computational time required for path re-planning for real-time threat avoidance may be significantly reduced. An exemplary method by which the onboard path re-planning software module may pre-process terrain data is described below.

After the path re-planning software module (ex. —Airborne E*) of the aircraft's onboard computing system receives an active flight plan from a Flight Management System (FMS) before aircraft takeoff, it creates a terrain pre-processing area based on the active flight plan. DTED or other forms of terrain elevation data for the specified area are processed into a data structure (ex. —an ELevation InDExed quadTree (ELDETREE) data structure, which will be described further below). The terrain pre-processing area along with its data structure (ex. —ELDETREE) is then assigned as the active path re-planning area for real-time threat avoidance. A switch point (SP) may be defined as a center of the terrain pre-processing area. Further, the switch point may also be a position on the active flight plan. A takeoff location for the aircraft is used as the first Switch Point. The straight line distance between two successive Switch Points (e.g., an active SP and its succeeding SP) must be equal to or greater than:

$$\eta=0.5*\text{LOS\_Range} \quad (1)$$

Where:

$$\text{LOS\_Range} = 3.57\left[\sqrt{h_1}+\sqrt{h_2}\right]$$

and is in units of kilometers;

$h_1$ and $h_2$ are altitudes of two successive Switch Points in units of meters;

$\eta$ is the minimum straight line distance between these two successive

SPs in units of kilometers.

With the takeoff position as the first SP, the next SP is determined as the first point on the active flight plan that has a straight line distance of at least $\eta$ away from its preceding SP. This process is then repeated to determine the subsequent SPs.

A circle is used as the intermediate step to determine the final pre-processing area. The objective at this intermediate step is to determine the minimum circle centered at the active SP that ensures all positions on the active flight plan between the active SP and its succeeding SP to be at least $\delta$ distance away from the boundary of the circle. $\delta$ is computed as $$\delta_i = 3.57\sqrt{h_i} \quad (2)$$

Where $h_i$ is the altitude of the ith point in units of meters and $\delta_i$ is in units of kilometers.

The radius R in units of kilometers for this minimum circle is determined as $$R = \overset{N}{\underset{i=1}{\text{MAX}}}(\|P_i - SP\| + \delta_i) \quad (3)$$

Where:

N is the total number of points between two successive SPs (e.g., the active SP and its succeeding SP) that need to be checked and is determined by propagating from a SP to its succeeding SP along the active flight plan with a distance interval of 3 nmi; $P_i$ is the 3D position for the ith point; and SP is the 3D position of the active Switch Point that is at the center of this circle.

Given R as the radius of a circle and SP as the center of a circle, the four corners of the minimum square area encompassing this circle can be determined. This minimum square area is the terrain pre-processing area for this SP. DTED terrain files are stored relative to latitude and longitude (i.e., geodetic coordinates). Therefore, to retrieve terrain data files covering this terrain pre-processing area, the geodetic coordinates of the four corners of the square terrain pre-processing area need to be determined. The following equations may be used to approximately determine the geodetic coordinates of these four corners, based on R and the SP:

$$\Delta\lambda = R/(R_A\cos\phi_{SP}) \quad (4)$$

$$\Delta\phi = R/R_B \quad (5)$$

$$\lambda_{NE}=\lambda_{SP}+\Delta\lambda \quad (6)$$

$$\phi_{NE}=\phi_{SP}+\Delta\phi \quad (7)$$

$$\lambda_{SW}=\lambda_{SP}-\Delta\lambda \quad (8)$$

$$\phi_{SW}=\phi_{SP}-\Delta\phi \quad (9)$$

Where $R_A$ is the semi-major axis of the WGS-84 earth model;

$R_B$ is the semi-minor axis of the WGS-84 earth model;

$\phi_{SP}$ and $\lambda_{SP}$ are the latitude and longitude of the SP, respectively;

$\phi_{NE}$ and $\lambda_{NE}$ are the latitude and longitude of the North-East Corner of the terrain pre-processing area and in the units of radians;

$\phi_{SW}$ and $\lambda_{SW}$ are the latitude and longitude of the North-East Corner of the terrain pre-processing area and in the units of radians.

With geodetic coordinates of the four corners of the terrain pre-processing area, appropriate DTED files can be retrieved from the onboard terrain data server and be processed into the ELDETREE data structure for this terrain pre-processing area.

When the aircraft passes the succeeding SP (i.e., Next SP) of the active SP, the active SP is switched to be this succeeding SP. The ELDETREE data structure for the terrain pre-processing area associated with this new active SP is also assigned as the path re-planning area. Airborne E* then starts to compute a new terrain pre-processing area and its ELDETREE for the succeeding SP of the new active SP. This process is repeated until the aircraft reaches its destination. FIG. 1 presents an exemplary illustration of the relationship between Active SP, Next SP (i.e., the succeeding SP of the Active SP), Active Planning Area, Terrain Preprocessing Area, and a Flight Plan. The Active SP is at the center of the Active Planning Area. The Next SP is at the center of the Terrain Preprocessing Area. The Active Planning Area is overlaid with a portion of the Terrain Preprocessing Area. All Switch Points are located on the flight legs. R in FIG. 1 is the radius defined in Eq. (3).

There may be several adjustments needed for the algorithm stated above to increase its robustness for operational uses. For low altitude flights, 8 computed with Eq. (2) may be relatively a small value that can result in the terrain pre-processing area being too small. Therefore, a minimum size for the terrain pre-processing area should be used to avoid having the path re-planning area be too small. In exemplary embodiments of the present invention, the size for the terrain pre-processing area may be equal to or greater than approximately 60 nmi by 60 nmi (or about one degree in latitude and one degree in longitude). Further, in some embodiments, if the Next SP cannot be found through Eq. (1), only the active planning area may be computed since there is no need to switch the active planning area any more. This situation may occur due to one of the following two reasons: 1) the distance between start location and destination may be relatively short, thus, the whole flight plan can be covered with one planning area; and 2) after going through multiple Switch Points, the destination is inside the active planning area. Thus, there is no need to compute another Switch Point.

Many currently available intervisibility algorithms use a flat earth assumption to simplify and speed up intervisibility computation. For example, these currently available algorithms may treat DTED terrain data stored in geodetic coordinates (ex. —in longitude, latitude) as terrain elevation data stored in a flat 2-dimensional (2-D) grid coordinate system, with no consideration of the Earth's curvature in the intervisibility determinations. Such an approach may be valid when two given locations are not far away from each other. However, when the two locations are far away from each other, the Line-Of-Sight (LOS) between the two locations may be blocked due to the curvature of the Earth. (ex. —one location is below the horizon of the other location). The LOS distance between two locations may be approximated as:

$$D_{LOS}=1.23[\sqrt{h_1}+\sqrt{h_2}]$$

Where $h_1$ and $h_2$ are the altitudes of the two given locations in units of feet; $D_{LOS}$ is the maximum intervisibility distance between these two points in units of miles without being blocked by the surface of the Earth.

When the distance between two locations is much greater than $D_{Los}$, there should be no intervisibility between these two locations because one location is lower than the horizon of the other location due to the curvature of the Earth. However, because many currently available intervisibility algorithms use a flat earth assumption, said currently available algorithms may mistakenly determine that there is still a clear LOS between the two far away locations.

Accurately taking into account the ellipsoidal shape of the Earth is a rather computationally intensive process because DTED data may be stored relative to their geodetic coordinates. Thus, many coordinate conversions may be required to determine intervisibility between two locations given their respective Earth-Centered, Earth-Fixed (ECEF) coordinates. In many instances, the LOS vector is constructed in ECEF coordinates and is propagated with a small step from one location to the other location for intervisibility determination. The propagated points on the LOS vector are often converted from ECEF coordinates to their geodetic coordinates with elevations in Mean Sea Level (MSL). Terrain elevations at these geodetic coordinates may then be determined based on interpolating DTED. If terrain elevations along the LOS vector are all lower than elevations of the LOS vector, a clear intervisibility may be declared. For example, a LOS length of 100 kilometers (km) may use at least 1,000 propagated points to be compared with DTED Level One terrain data. Therefore, intervisibility determination for this LOS vector may require 1,000 coordinate conversions. If 100,000 intervisibility determinations are needed for real-time path planning, the total number of coordinate conversions from ECEF to geodetic coordinates with elevations in MSL may exceed 100 million. Thus, intervisibility determination is usually the most time-consuming part of the process for constructing a safe and terrain-masked path.

As mentioned above, one way which the present invention may expedite intervisibility computation is to pre-process DTED data. As previously discussed, during pre-processing DTED data may be processed (ex. —pre-processed) into a data structure (ex. —ELDETREE data structure). There are various existing algorithms that can take into account terrain data and construct collision-free paths in real-time. But, these algorithms are computationally intensive and only plan short range paths in real-time. Since collision checking with terrain data is the most computationally intensive part of the long-range path planning process, it is critical for real-time flight planners to perform accurate collision checks very rapidly. The data structure of the present invention (ex. —ELDETREE data structure) efficiently and accurately bounds terrain elevations based on digital terrain databases. In exemplary embodiments of the present invention, a terrain bounding function is performed by the flight planning software module (ex. —Airborne E*), said terrain bounding function dividing search space into multiple zones, each zone being provided a data structure (ex. —ELDETREE) to discretize the zone area into variable-sized 2-D cells using a hierarchical cell decomposition algorithm. The objective of this space discretization algorithm is to reduce the continuous planning space into a discrete graph that enables fast collision checks in real-time, while still being extensive enough to enable the generation of near-optimal paths.

The ELDETREE is a quadtree-type hierarchical structure that 1) recursively divides a region based on the current size of the region and the obstacle status of the region and 2) recursively merges nodes based on the difference between the minimum and maximum obstacle elevations. Each leaf node of the ELDETREE has a double array of elevation/time indices used to discretize altitude and time. This method enables the reference path generator to efficiently determine the altitude transition between nodes and perform moving obstacle collision checks. The ELDETREE design may use DTED terrain to capture terrain information, however, other sources of terrain data can easily be used with some modifications.

Steps for how ELDETREE is created and how the reference path and path-refinement steps of Airborne E* use the ELDETREE are described below.

The ELDETREE uses digital terrain data files and geodetic coordinates of non-terrain obstacles to capture terrain and threat data, respectively.

Figure 2:
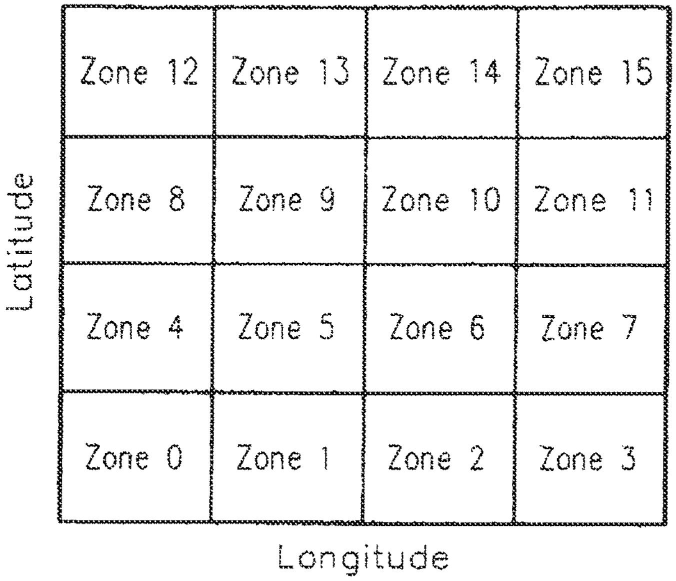
FIG. 2 is an illustration of a path planning area divided into multiple zones uniformly in geodetic coordinates in accordance with an exemplary embodiment of the present invention.

During ELDETREE initialization, the minimum and maximum elevations are recorded for DTED tiles in the region area to be decomposed. DTED data is grid-based, in that each row and column pair yields the measured elevation posting. A DTED tile is the area defined by a given row and column in DTED files. In the exemplary embodiments of the present invention, a multi-zone approach may be used to approximate the ellipsoidal shape of the Earth within the path planning area, thereby promoting faster intervisibility computation. The path planning area is divided into multiple zones uniformly in geodetic coordinates, as shown in FIG. 2. DTED in each zone are processed and stored in a 2D grid coordinate system through an Ellipsoidal Transverse Mercator (ETM) projection by the ELDETREE. The center position of each zone is used as the reference position for the ETM projection to map horizontal components (i.e., latitude and longitude) of all 3D positions in that particular zone into a 2D grid coordinate system (Easting and Northing), with elevations relative to Mean Sea Level (MSL). In other words, positions in ECEF coordinates inside a zone are mapped into a 3D grid coordinate system (Easting, Northing, and Altitude in MSL) with the center position of the zone as the reference position for the ETM projection.

Once the path planning space has been divided into multiple zones based on the mission's needs, the next step is to set up an ELDETREE for each zone. First, the DTED data must be loaded for the whole active planning area (i.e., for all zones), as illustrated in FIG. 1. Once the DTED terrain is loaded, each zone can now be setup for space decomposition using the ELDETREE. The ELDETREE nodes are determined in a 3D grid coordinate system based on the ETM projection. The setup procedures for each zone are described below.

In exemplary embodiments of the present invention, the zone's boundaries are determined based on the geodetic coordinate system and must be converted to the 3D grid coordinate system for ELDETREE processing. When the four corners of the zone boundary are converted to the 3D grid coordinate system, the easting and northing lengths will differ due to the conversion from geodetic to ETM. The goal is to capture the whole zone in the grid coordinate system. Therefore, some overlapping will occur between neighboring zones in their respective 3D grid coordinate systems. The longest easting length $T_E$ of the four corners will be used. The northing length requires some extra calculations to capture the whole zone area in the grid coordinate system. When the zone boundary is converted from geodetic to the grid coordinate system, the North and South latitude boundaries create a curve in ETM. The height of the curve on the longitude line at the reference point for both the north latitude and south latitude values will determine the extra overlapping required for the northing length, $T_N$. In other words, it may be necessary to overlap the grid due to converting from geodetic to grid coordinates to ensure that the whole zone is captured with the ELDETREE. The longitude line at the reference point is referred to as the central meridian of the zone and it equally divides the zone. So, for calculating the easting length, a maximum of the easting values of North-East and South-West corners may be taken. $T_E$ is then twice of this value since the reference point is at the center. Because the latitude lines make a curve in grid coordinates, simply using the SW to NW or the SE to NE lengths will exclude some of the zone. Therefore, $T_E$ and $T_A$, are calculated as:

$$T_E=2*\max(NE_x,SE_x) \tag{10}$$

$$T_N=2*\max(|NCM_y,SCM_y|) \tag{11}$$

Where $NE_x$ represents the easting value of the northeast corner and $SE_x$ represents the easting value of the southeast corner. $NCM_y$ represents the northing value of the north central meridian of the zone and $SCM_y$ represents the northing value of the south central meridian of the zone.

In further embodiments of the present invention, the minimum easting and northing lengths record the length of the ELDETREE nodes at the highest possible level of the tree given that the root node starts at level zero. The minimum easting and northing length for a node are saved for each zone to enable rapid terrain masking using locational codes. First the highest tree level is determined based on the desired minimum cell size, ζ. This is calculated by $$T_{Level}=\left\lfloor \log_2\left(\min\left(\frac{T_E}{\varsigma},\frac{T_N}{\varsigma}\right)\right)\right\rfloor \tag{12}$$

Where $T_E$ represents the easting length of the terrain for the zone, $T_N$ represents the northing length of the terrain for the zone and ζ represents the desired minimum cell size. Once the tree level has been determined the minimum easting and northing length at the highest possible level of the tree can be determined by $$TS_E=\frac{T_E}{2^{T_{Level}}} \tag{13}$$

$$TS_N=\frac{T_N}{2^{T_{Level}}} \tag{14}$$

After the easting and northing lengths of the ELDETREE as well as the minimum easting and northing cell size are determined, ELDETREE can then be computed for each zone. Before creating the ELDETREE, the root node must be initialized. The region of the root node is assigned to be the area defined by $T_E$, $T_N$, and the reference position of the zone. The current region status of the root node must be set and the obstacles IDs that occupy the region must be recorded. The status of a region indicates whether the area can be traversed.

The ELDETREE is created by 1) recursively dividing a region into quads based on the current size of the region and the obstacle status of the region and 2) recursively merging nodes based on the difference between the minimum and maximum terrain elevations. Therefore, the ELDETREE is generated from the top-down with the capability to merge from the bottom-up. This unique hybrid approach enables us to efficiently read in the DTED data for a region at the highest level, n, in the tree and then communicate the elevation data to levels 0 thru (n−1). After the tree has been created the DTED data is no longer needed. Therefore the ELDETREE will be the sole source for terrain information. Updates to the tree, such as new obstacle information, may require performance of a rediscretization step. Rediscretization only updates the affected portions of the tree so the ELDETREE may recursively divide the affected regions into quads based on: 1) the current size of the region; and 2) the obstacle status of the region. Merging is not needed for rediscretization because the elevation data collected from the DTED database has not changed. There are four steps for creating ELDETREE: 1) creating a tree node; 2) determining the region status; 3) creating the tree node end; and 4) merging leaf nodes when applicable. These four steps will be discussed further below.

The root's region status and known obstacles are determined during initialization. The root "creates" child tree node regions by dividing the region area of the root into four equal parts. Child nodes are automatically created if at least one of the following conditions is met: 1) the root region's maximum and minimum elevation difference has not been determined AND the region area exceeds the minimum size AND the region is not fully occupied by an obstacle; 2) The region area exceeds the minimum size AND the region is partially occupied by an obstacle. If at least one of the above conditions is met then this function drives the ELDETREE recursion process by creating a new child node and determining its region status. In cases where neither condition applies, then this node becomes a leaf node of the ELDETREE. A leaf node has no child nodes and stores extra information such as leaf node neighbors and the set of elevation and time indices. At this point, the leaf node is checked to see if the maximum and minimum elevation from the DTED data tiles has been collected. If the DTED data has not been collected, then all the DTED tiles that make up the region area of the leaf node are collected and the maximum and minimum elevations are determined.

Figure 3:
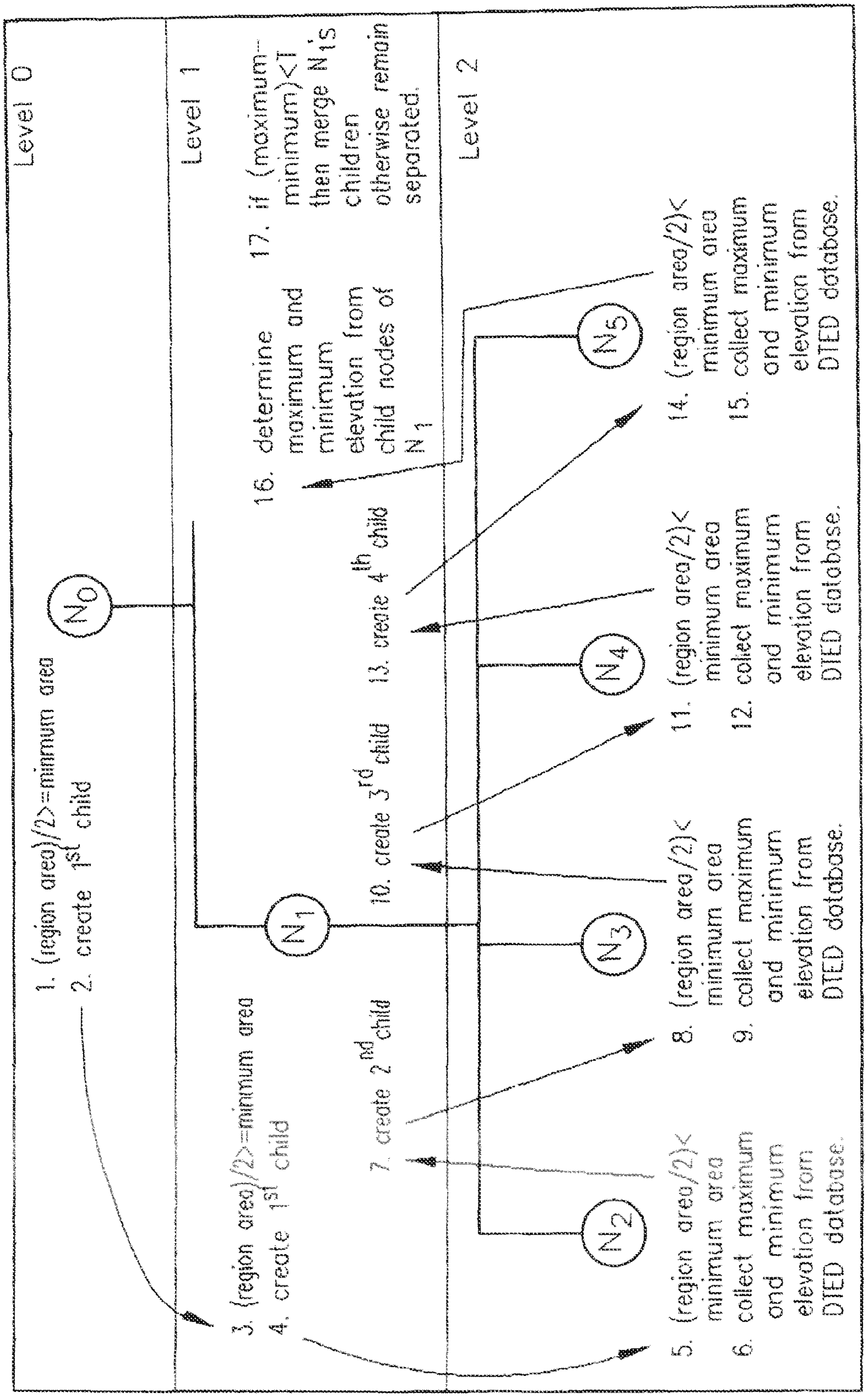
FIG. 3 is a schematic of an ELDETREE recursion process in accordance with an exemplary embodiment of the present invention.

FIG. 3 shows an example ELDETREE creation with a level count of three (i.e. Level 0, Level 1 and Level 2). This example shows how the elevation extrema are determined when no obstacles are present by using a total of 17 steps. At Level 0, the region area divided by two is greater than the minimum area. The region area represents the area of the current node, so when divided by two the area represents the size of a child node. It may be desirable to continue to the next step only if the child node region area exceeds or equals the minimum area. In embodiments where this condition is met, a child may be created at step 2, as shown in FIG. 3. After step 2, the algorithm may be at Level 1 and the region area may represent the area of node $N_1$. Region area divided by two exceeds or equals the minimum area, so at step 4 a child is created. At step 5, the region area divided by two no longer meets the minimum area requirement so neither condition outlined above is met so the node becomes a leaf node. At step 6, the maximum and minimum elevations are determined from the DTED tiles for the region area of the leaf node. The recursion exits this level and returns to Level 1. Steps 4, 5 and 6 are repeated three times until finally at step 16 all elevation data has been collected for node $N_1$'s children. At step 17, the leaf node elevation differences are compared and if the difference is smaller than the elevation threshold, T, the nodes will merge.

In exemplary embodiments of the present invention, once the root region decides to create four child nodes, preparations may be made for the child node to become the new root. The child becomes the new root because recursion allows for the same operations to be performed on the child nodes as though the child was the root even though the root node specified at setup never really changes. The region status and obstacles of the child nodes may be determined so that when the child node becomes the new root, the region status and obstacle IDs are already known. The determination of region status takes into account terrain and other static man-made obstacles for a given region. Region status can be enumerated as FREE, FULL or MIXED. The following describes the meanings of each region status:

FREE: The terrain information for this region is valid and no obstacles occupy the region.

FULL: The region lies outside of the DTED terrain collected and/or an obstacle completely occupies the region.

MIXED: The terrain information for this region is valid and an obstacle(s) occupies portions of this region.

In further embodiments, once the region status and obstacle IDs for the child node have been determined, the child node is saved and it becomes the new root node so the recursion continues until the exit criteria is met. The exit criterion is when the node cannot be divided because neither of the two conditions set forth above can be met. The child nodes may only be merged during the creation of the ELDETREE. Once the tree has been created, it may be modified during rediscretization, but the merging step does not apply during rediscretization. This is because merging only applies to the terrain elevation data and during rediscretization terrain data does not change. During the tree creation, merging begins after the leaf nodes of a region have been reached. So, first the ELDETREE recursively traverses to the highest level possible. The highest level possible is determined by the number of levels it takes until a region area can no longer divide due to the minimum area requirements. The elevation extremities for the region area of the leaf node may be determined from the DTED elevation data. After all four child nodes of a region collect extrema elevation data, the extrema elevation for the parent node is determined by:

$$X=\max\{\chi_1,\chi_2,\chi_3,\chi_4\}$$

$$Y=\min\{\gamma_1,\gamma_2,\gamma_3,\gamma_4\} \quad (15)$$

Where,

X is the maximum elevation for the parent node given the maximum elevation values, $\chi_n$ and n=[1 . . . 4], for each child region.

Y is the minimum elevation for the parent node given the minimum elevation values, $\gamma_n$ and n=[1 . . . 4], for each child region.

So that if, $(X-Y)<T$ then, the child nodes could merge as long as the parent node is free of obstacles and meets the size constraints $(X-Y)>=T$ then, the child nodes will remain separated.

FIG. 3 shows when the DTED information is collected and how it is distributed to the parent nodes when the ELDETREE has a maximum of three levels (i.e. Level 0, Level 1 and Level 2). At level 2, the leaf nodes are discovered and extrema DTED elevation information is collected for each of the leaf nodes (i.e. steps 6, 9, 12, and 15). At step 16, X and Y are computed. At step 17, the difference between X and Y is computed to compare it with the elevation threshold, T, to determine if the child nodes should merge. When child nodes merge, the parent node becomes the new leaf node. The merging check continues at each level so that when the ELDETREE is built, all the nodes will have the proper extrema elevation. Because of this merging ability, the ELDETREE is generated using top-down and bottom-up techniques.

Once the ELDETREE structures have been built, each node of the tree may collect references to the surrounding neighbor nodes. This step enables fast collision checking by allowing the flight path to be traced through the ELDETREEs. Neighbors inside a zone may be collected using known collection techniques. Neighbors along the boundaries of zones may be collected via a table look-up technique or via non-table methods (which may be generalized to higher dimensions). During ELDETREE setup and rediscretization, ELDETREE leaf nodes at the boundaries of a zone should connect to their neighboring ELDETREE leaf nodes located at neighboring zones. Therefore, the connectivity of leaf nodes for the entire planning area is properly determined, even though multiple ELDETREEs are used in the planning area. There are four steps towards finding all the zone neighbors: 1) All the ELDETREE leaf nodes on the boundary of a zone are collected; 2) The zone edge neighbors are located for each of the boundary nodes; 3) The zone vertex neighbors are located for each of the boundary nodes; and 4) Zone edge neighbors and zone vertex neighbors identified from Steps 2-3 are updated to include the boundary node. These four steps are done for each direction (North, South, West and East) of the border. During the ELDETREE initialization phase the above four steps only need to be completed for two of the sides since all the zones are getting initialized and the neighbors of a node, n, in a particular zone A are updated to have node n as a neighbor. The two sides chosen must not be parallel to each other. In other words, if the North side is updated, then the other side can be West or East, but not South. Once two sides are selected, every zone must have the same two sides updated. During rediscretization, however, all sides of the zone must be updated because only those zones affected by obstacles are updated.

Figures 4A, 4B:
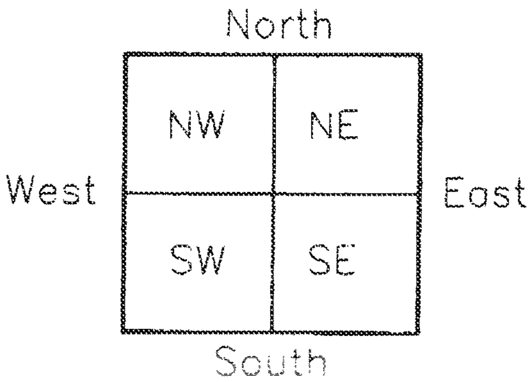
FIG. 4A is a representation of a neighbor presence table in accordance with an exemplary embodiment of the present invention.
FIG. 4B is a representation of an ELDETREE quadrant showing directions along the boundaries and locations within the quadrant in accordance with an exemplary embodiment of the present invention.

In exemplary embodiments, the boundary nodes are found through an iterated process starting from the root node to leaf nodes. A neighbor presence table as shown in FIG. 4A may be used to determine which locations exist outside of the quadrant given the border direction. A True entry indicates that the location does not have a neighbor within the same quadrant in that direction so therefore it is a boundary node in that direction. To find the North boundary locations of the zone in FIG. 4B, scroll across the row indicated as North in the table shown in FIG. 4A and collect all True entries. As shown in FIG. 4B, an ELDETREE zone with 4 leaf nodes, the NW and NE locations make up the North boundary.

Once a node is determined to be on a boundary of a zone in a certain direction, the node's edge in that direction may be checked for zone neighbors. The neighboring zone may be found first for the given direction D. For example, in FIG. 5, the North neighbor of Zone 0 is Zone 2. If no neighboring zone is found, there are no ELDETREE edge neighbors in direction D. After a zone neighbor is found, for each level of the ELDETREE leaf node in a particular Zone A, a Neighbor Index Table as shown in FIG. 4C may be used to find the neighboring ELDETREE leaf node in its neighboring Zone B. Given an ELDETREE leaf boundary node along a direction D, indexed by the bit code $b_1b_2 \ldots b_m$ in this Zone A, the neighboring node in Zone B may be found. This is because the bit code is built based on the quadrant of the tree it is located at for each level. In an exemplary tree structure, NW equals bit code 00, NE equals 01, SW equals 10 and SE equals 11. The bit code is extracted for level 1 of the tree, $b_1$, and the Neighbor Index Table shown in FIG. 4C may be used along with direction D to get the bit code for $b_1$ in the neighboring zone, Zone B. This step may be repeated for all levels of the bit code found in Zone A. The result yields a new bit code $b_1b_2 \ldots b_m$ in Zone B. This step only finds the neighboring ELDETREE quadrant in Zone B at the same level, m, as in Zone A.

Figure 5:
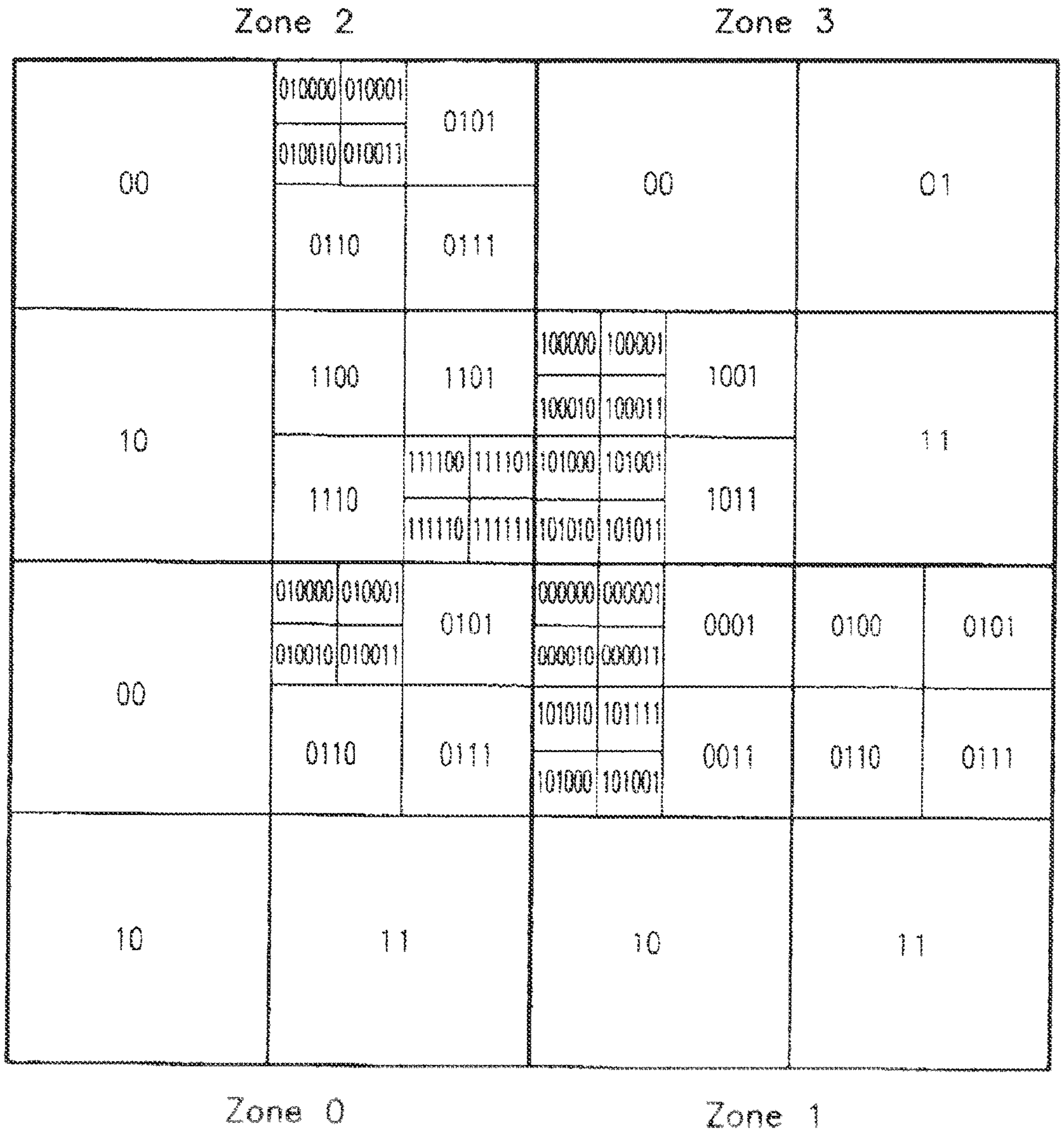
FIG. 5 is a representation of a zoned ELDETREE having each bit-code labeled in accordance with an exemplary embodiment of the present invention.

FIG. 5 represents an exemplary embodiment of a Zoned ELDETREE structure with all the bit codes labeled for each ELDETREE leaf node. For example, given bit code 0001 in Zone 1, this example may include walking through the method to find the North edge neighbor in Zone 3. First extract $b_1$ and use the Neighbor Index Table of FIG. 4C to find the corresponding bit code in Zone 3 in the North direction. Next extract $b_2$ and use the Neighbor Index Table of FIG. 4C to find the corresponding bit code in Zone 3 in the North direction. The results are shown below:

$$\phi(b_1,N)=10$$

$$\phi(b_2,N)=11$$

The neighboring edge node in Zone 3 is equal to the collective results from $\phi(b_1,N)$ and $\phi(b_2,N)$ yielding the bit code 1011 as shown in FIG. 5.

Vertex zone neighbors are defined as ELDETREE leaf nodes located in Zone A that are neighbors to ELDETREE leaf nodes located in Zone B based on the vertex. The first step is to find the zone in which vertex neighbors will be located. The relationship between the zone and an ELDETREE leaf node can be one of the two types: 1) A vertex-to-vertex neighbor with the ELDETREE leaf node; 2) A vertex-to-edge neighbor with the ELDETREE leaf node. An ELDETREE leaf node with a vertex-to-vertex relationship with a zone may have a repeating bit location for each level that matches the vertex location. For example, to find the SW vertex of an ELDETREE leaf node given bit code as 10101010, this ELDETREE leaf node in the SW location must have a vertex-to-vertex relationship with a zone. For example, in FIG. 5, referring to Zone 3 and the ELDETREE leaf node with bit code 101010, the SW vertex has a vertex-to-vertex relationship with Zone 0. For cases with non-repeating bit patterns, the ELDETREE leaf node may have a vertex-to-edge neighbor relationship with a zone.

After a zone neighbor is found by the first step, the second step is to find the bit code of the neighbor for the vertex. If no zone neighbor is found, an ELDETREE leaf node neighbor does not exist for the vertex location. An ELDETREE leaf node can connect to its vertex neighbor by this neighbor's vertex or edge. For example, in FIG. 5, bit code 010001 found in Zone 0 for the NE direction has a vertex-to-vertex neighbor with bit code 111110 in Zone 2. Bit code 010001 in Zone 0 for the NW direction has a vertex-to-edge neighbor relationship with bit code 1110 in Zone 2. The following pseudocode describes the process to determine the bit code of the neighboring ELDETREE leaf node:

1. Assign i=m, where m is the highest bit code level.
2. The $i^{th}$ level of the bit code, $b_i$, is negated to become $n_i$.
3. If $\Gamma(b_i,L)$ equals 'C' then
   i=i−1;
   if i>0 return to step 1, otherwise return $n_1n_2n_3 \ldots n_i$.
   where $\Gamma(b_i,L)$ is the Vertex Neighbor Table defined in FIG. 4D.
4. Else if $\Gamma(b_i,L)$ equals 'S' then
   Error has occurred with collecting boundary node because the vertex neighbor should not be in the same quadrant.
5. Else
   The next level, i−1, will have the neighbor vertex along the edge instead of along the vertex so find the direction of the edge to check direction $D=\Gamma(b_{i-1},L)$.
   Find the edge node neighbor given $b_1b_2b_3 \ldots b_{i-1}$ and D and assign to $q_1q_2q_3 \ldots q_{i-1}$
   Copy bit pairs $q_1q_2q_3 \ldots q_{i-1}$ to $n_i \ldots n_m$ and return.

After the set of boundary neighbors has been located for an ELDETREE leaf node, each boundary neighbor in the set can be updated to include the ELDETREE leaf node itself by reversing the relationship. This method allows for updating only 2 sides of the boundary as mentioned above during initialization. This method also ensures that during rediscretization, all neighbor relationships are updated because all four sides of the boundary of a zone are recomputed. The method also cleans up the neighbor data of leaf nodes bordering the zones that get rediscretized. This is done by looping through all the neighbors of bordering leaf nodes and checking to make sure each neighbor is still a leaf node. If a neighbor is no longer a leaf node then during the rediscretization step, this neighbor node is divided and some of its child leaf nodes are included in the neighbor list instead. Therefore, this neighbor node should be deleted from the neighbor list of that bordering leaf node.

In further embodiments, once obstacles have been detected and processed, the ELDETREEs of the affected zones may be updated to reflect the obstacles. To determine the zones affected by obstacles, the axis-aligned bounding box (AABB) for each obstacle may be compared with each zone's boundary. If an obstacle falls inside of a zone's boundary then the location of the obstacle may be recorded within that zone. After all obstacles have been processed and recorded in the zones they affect, ELDETREEs for those affected zones may need to be recomputed.

When new pop-up obstacle information is received, ELDTREEs need to be updated to capture new obstacle data. The process for updating EDLETREEs with new threat data is divided into two steps: 1) determining which zones in the planning area are occupied by threats; and 2) determining which regions in an occupied zone are occupied by threats. In exemplary embodiments, only ELDETREEs for zones occupied by new obstacles need to be updated. The algorithms for determining which zones are occupied by threats are presented in the following subsections for three types of threats:

Stationary Spherical Threats

1. Approximate the threat radius in geodetic coordinates.

$$R_{rad}=R_m/R_e^{min} \quad (16)$$

Where $R_m$ is the threat radius in units of meters;
$R_e^{min}$ is the semi-minor axis of the WGS-84 ellipsoidal model of the earth;
$R_{rad}$ is the approximated threat radius in unit of radians.

2. Represent the geodetic coordinates of a stationary spherical threat with a center at (ϕ,λ) and a radius of $R_{rad}$, where ϕ is the latitude of the center and λ is the longitude of the center.
3. Construct an axis-aligned bounding box for this spherical threat with a center at (ϕ,λ) and a radius of $R_{rad}$.
4. Vertices of the axis-aligned bounding box of a threat are compared with each zone in the geodetic coordinate system to rapidly and approximately determine which zones are occupied by this stationary spherical threat.

Stationary Polyhedron Threats

1. Construct an axis-aligned bounding box for each stationary polyhedron threat in geodetic coordinates with elevations relative to Mean Sea Level (MSL).
2. Vertices of the axis-aligned bounding box of a threat are compared with each zone in the geodetic coordinate system to rapidly and approximately determine which zones are occupied by this stationary polyhedron threat.

Moving Polyhedron Threats

1. For each time period t in the look-ahead time, a stationary copy of the polyhedron is propagated to the beginning of the time period by using the last known velocity of the moving polyhedron threat. A time period may be defined as an interval of time used to discretize the 4-D planning space. The planner only takes into account threats blocking the flight path for a look-ahead time period. The look-ahead time period is determined based on the operational needs of the mission.
2. A new stationary polyhedron threat for the time period t is created by calculating the convex hull of the vertices of the polyhedron threat at the beginning of the time period t with the vertices of the polyhedron threat at the end of the time period t+1 in the geodetic coordinate system.
3. Construct an axis-aligned bounding box for the new stationary polyhedron threat for time period t in geodetic coordinates with elevations relative to Mean Sea Level.
4. Vertices of the axis-aligned bounding box for each of the time period stationary polyhedron threats are compared with each zone in the geodetic coordinate system to rapidly and approximately determine which zones are occupied by this moving polyhedron threat.

To find the affected regions in an occupied zone, recursion may be used to zoom into the correct locations in the ELDETREE. The following pseudo-code describes the update process:

1. Determine the updated region status for the root node.
2. If the root node is a leaf node then do the following, skip to Step 3. Otherwise, perform the following.
   a. If obstacles exist in this region then for each child node go back to step 1 (the child node becomes the new root node), otherwise exit because this region does not need updated.
3. If obstacles exist in this region then do the following, else exit because this region does not need updated.
   a. If the previous region status==FREE then the cell is newly occupied by an obstacle so update the region status with the updated region status and update the ELDETREE at this node by calling the create tree node function.
   b. If the region status==MIXED then update the ELDETREE's elevation and time indices to capture the elevation and time interval that the obstacle occupies this node region.

Once the updates to the ELDETREE have been computed, the neighbor connections are updated for the whole tree.

In exemplary embodiments of the present invention, the ELDETREE may be a four-dimensional (4-D) data structure that stores data relative to three-dimensional (3-D) space plus one-dimensional (1-D) time. The ELDETREE leaf nodes define the volumes of the terrain over two-dimensional (2-D) ground cells and provide (2-D) ground track information for creating virtual planning spaces for elevation and time. Each leaf node of the ELDETREE may have a double array of indices representing the elevation and time space. The purpose of these elevation/time indices is to hold state information of the volume of space for a particular time interval. There exist 4 possible states that each elevation/time interval can hold—unoccupied, occupied, occupied but needs checked for terrain masking, or an assigned A* state ID. The Unoccupied state means that the ELDETREE leaf node's elevation/time index is free of terrain and any other obstacles, stationary or moving. If terrain masking is selected, the cell may be located within a threat zone, but masked by terrain relative to threats. The Occupied state means that the ELDETREE leaf node's elevation/time index is occupied by terrain and/or other obstacles. If terrain masking is selected, then this cell has been checked and found to be inside the threat zone and is also visible by the threat. The Occupied but needs checked for terrain masking state means that the ELDETREE leaf node's elevation/time index is occupied by a static obstacle. This state is only used when terrain masking check is turned on. This state is used to indicate to the path replanner that the volume is inside the threat zone of a static man-made threat (not terrain) and has not been checked by the terrain masking function. This is a temporary state that could become either unoccupied or occupied status later. The assigned A* state ID state references the fact that the A* reference planner creates internal planning states on-the-fly. The planner expands states based on the connectivity of ELDETREE neighboring leaf nodes. Once a 4-D state has been created, it may be possible for other 4-D states to connect to it.

In further embodiments of the present invention, the ELDETREE structure may be used to rapidly locate a 4-D point by first locating the leaf node using ground track information. Once the leaf node has been found, the altitude and elapsed time may be used to locate the correct elevation/time index. The zone containing the point location may be determined by converting its position to geodetic coordinates and comparing them with zone boundaries. Once the zone has been determined, the ELDETREE within that zone may be used to determine the 2D position location. The ELDETREE is an efficient structure to hold terrain data because the terrain can be represented in a non-uniform grid so that similar areas can be grouped together in larger region nodes. However, the challenge with any non-uniform grid structure is how to locate a point within the grid rapidly. Point location is the foundation for most operations used with the ELDETREE. Therefore, this operation has to be relatively simple and fast. In exemplary embodiments, Morton Codes may be used to construct locational codes based on the position and then, an interleaving method may be used to traverse to a proper tree node. The locational codes may be determined as:

$$EastLocCode = \frac{x + \frac{T_E}{2}}{TS_E} \quad (17)$$

$$NorthLocCode = \frac{y + \frac{T_N}{2}}{TS_N} \quad (18)$$

Where, x is the easting position, y is the northing position, $T_E$ is the easting length of the zone, $T_N$ is the northing length of the zone, $TS_E$ is the smallest easting cell length in the ELDETREE, $TS_N$ is the smallest northing cell length in the ELDETREE, EastLocCode is the easting locational integer code in $$\left[0, \frac{T_E}{TS_E} - 1\right]$$

NorthLocCode is the northing locational integer code in $$\left[0, \frac{T_N}{TS_N} - 1\right]$$

The locational codes may be interleaved into a single value and used to traverse the tree. During traversal, bit depth levels may be pre-computed to avoid costly arbitrary left shifts and shifting by constants.

For example, given $$\left(x + \frac{T_E}{2} = 122,\ y + \frac{T_N}{2} = 177, \text{ and } TS_E = TS_N = 25\right)$$

then,

EastLocCode=integer (122/25)=4

NorthLocCode=integer (177/25)=7

To traverse the tree, the locational code bits are interleaved into a single value. The bits for each locational code should equal the highest level of the tree. In this example, the tree has four levels with the highest level of three (i.e., Level 0, Level 1, Level 2 and Level 3). If the tree had five levels, then the binary representation would be (0100, 0111). Each region in the quadtree has a unique binary identifier based on the location and level of the child.

The elevation indices are discretized based on the deviation point located on the original path. This deviation location is the starting point for re-route. For example, if the deviation point is at 20,000 ft and there are a total of 11 allowable elevation indices with an elevation interval of 500 ft, the elevation indices start at 20,000−(500*5) feet and end at 20,000+(500*5) feet. The elevation index for a given point can be determined as:

$$\text{Elevation\_Index} = \left\lfloor \frac{z - z_{min}}{\beta} + 0.5 \right\rfloor \quad (19)$$

Where z is the altitude of the point; $z_{min}$ is the altitude for the first elevation index; and β is the height of each elevation index.

Each elevation index has a set of time indices. A time index represents the 3-D volume (the 2-D ground track of the ELDETREE leaf node and the height interval of the elevation index) for a particular time interval. The number of time indices for each elevation index and the length of the time interval for each time index may be based on the mission and/or aircraft requirements. For example, if the maximum range for the aircraft is 315 nmi and the average cruise speed is 150 knots (kts) and the time interval is 5 minutes, there should be at least 26 time intervals (315/150=2.1 hours or 126 minutes; 126/5=25.2 intervals which ends up equaling 26 because the value must be an integer). The time index for a given point can be determined as $$\text{Time\_Index} = \left\lfloor \frac{t(S, X)}{\tau} \right\rfloor \quad (20)$$

Where t(S, X) denotes the time to traverse from the deviation point, S, to the current point, X; and τ is the time interval length. The calculation for time index assumes that the elapsed time at the deviation point, S, is zero.

In exemplary embodiments, once the ELDETREEs have been created, both moving and stationary obstacle information are captured in these trees. This obstacle information may easily be accessed and used very efficiently by many applications.

Terrain masking is the notion of aircraft traversing through threat zones unnoticed by the threats because terrain obstructs the intervisibility between the aircraft and the threats. Checking a path to be masked by terrain is time consuming since it may require many line-of-sight (LOS) checks along the specified path. LOS is defined as the straight line connecting the threat to a position on the path. In exemplary embodiments of the present invention, the LOS may be checked to determine whether the line segment (exs. —path or path segment) is blocked by terrain. If terrain blocks the line segment, the current location on the path is terrain-masked and is safe. This procedure must be repeated many times on the path segment and, therefore, may make the determination of terrain masking very computationally expensive. For real-time path replanning, a rapid terrain masking determination is needed. The ELDETREE increases the efficiency of the terrain masking task by: a) checking only ELDETREE leaf nodes located in a threat zone; b) tracing the line-of-sight (LOS) through the grid-based tree structure versus the raw DTED data in geodetic coordinates; c) checking large intervals of the path segment at a time; and d) recording which locations have already been checked.

Figure 6:
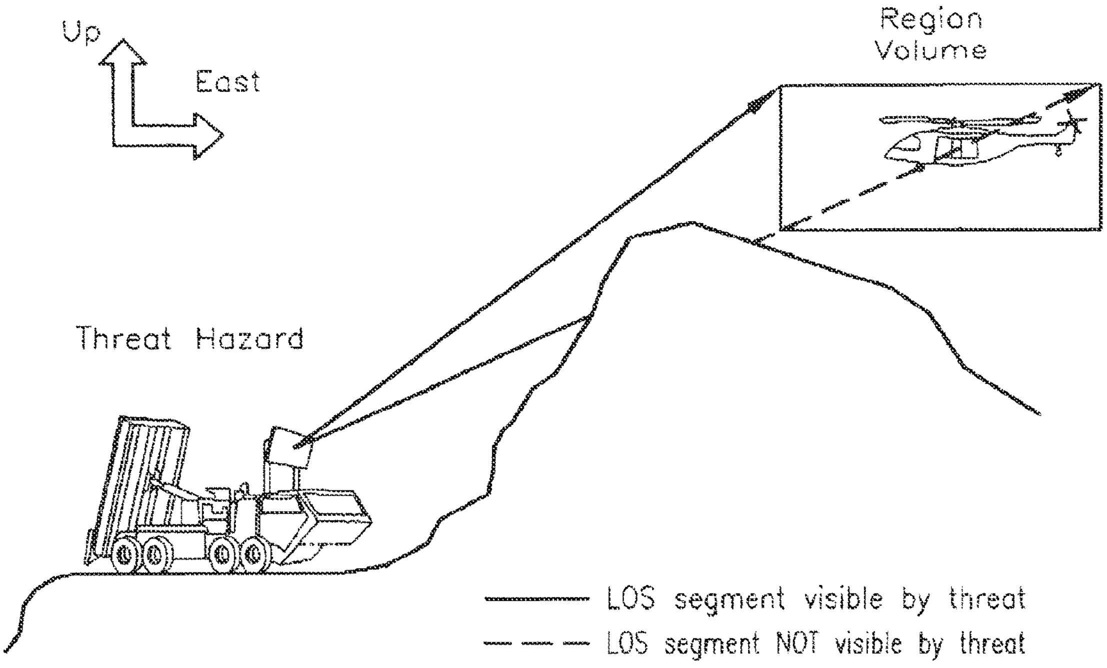
FIG. 6 is an illustration of a region volume which is located east of and at a higher elevation than a threat in accordance with an exemplary embodiment of the present invention.

In exemplary embodiments, when a portion of the path segment has been located within a threat zone and the current state of the 4-D location is "Occupied but not terrain masking checked," the terrain masking function must be called to determine whether the path segment in this state is blocked by terrain. The 4-D location (ex. —region volume) may refer to an ELDETREE leaf node's elevation/time index as described above. The region volume may be represented by an Axis-Aligned Bounding Box (AABB). Due to the nature of terrain obstruction, only LOS vectors connected to points on the sides of the region volume that have higher slopes need to be checked for terrain masking since all LOS vectors with lower slopes will be blocked by terrain, if LOS vectors with higher slopes are blocked. In other words, only points on at most two upper sides, not all sides, of the region volume need to be checked for terrain masking. FIG. 6 shows a simple example to illustrate this fact, as will be discussed below.

Figure 7:
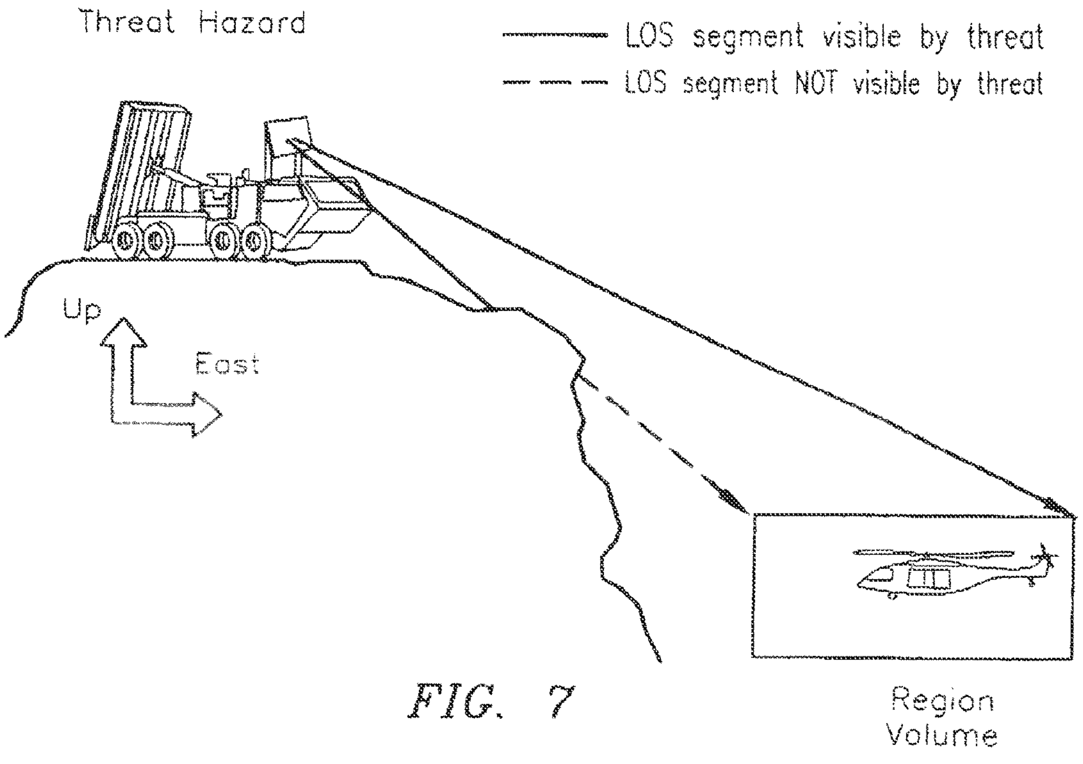
FIG. 7 is an illustration of a region volume which is located east of and at a lower elevation than a threat in accordance with a further exemplary embodiment of the present invention.

In further embodiments, determining which sides of the region volume are to be checked may be based on the direction and height of the threat relative to the center of the region volume. For instance, if the region volume is located at a northeast direction relative to the threat (ex—is located east of and at a higher elevation than the threat, as shown in FIG. 6), only the upper south and upper west sides of the region volume may need to be checked. In such instance, only the upper west side may need to be checked for terrain masking because it has the higher slope. For the case where the region volume is located at a southeast direction relative to the threat (ex. —is located east of and at a lower elevation than the threat, as shown in FIG. 7), only the upper north and upper east sides of the region volume may need to be checked. In such case, only the upper east side may need to be checked because it has the higher slope.

In exemplary embodiments, after the side(s) to be checked are determined, a LOS vector may be computed from the center of the threat to a first waypoint on the first side to be checked. A Bresenham algorithm may then be used to determine which points on the LOS vector should be checked with the ELDETREE. Each point, identified according to Bresenham's algorithm on the LOS vector, is located in the tree according to the method discussed above. Once the point has been located in the tree, the altitude of the LOS vector at that point is compared with the altitude of the bottom surface of the ELDETREE node containing the ground track of this point. The lowest elevation is used because the ELDETREE discretizes terrain. Therefore, the whole volume of the leaf node may not be completely full of terrain. Only the bottom surface of the node volume is guaranteed to be completely full of terrain. LOS vectors may be created along a particular side of the region volume at intervals according to the minimum tile size of the ELDETREE. A region volume may be declared as terrain masked only if all LOS vectors from all the sides that need to be checked are blocked by terrain.

In further embodiments, pseudo code for determining intervisibility between two given locations in ECEF coordinates is set forth below. It is assumed that the LOS vector in ECEF coordinates is computed from the threat location to a featured point. Said pseudo code for determining intervisibility between two given locations in ECEF coordinates is provided as follows:

1. Determine the zone IDs of the threat location and the featured point.
2. If the featured point is at a different zone, use the LOS vector to determine an exit point out of the zone occupied by the threat in ECEF coordinates. Otherwise, treat the featured point as the exit point. (If the threat location and the featured point are at different zones, the LOS vector is divided into multiple segments)
3. Assign the threat location as the start point of the line segment.
4. Convert the ECEF coordinates of the start location and the exit point of the line segment to the 3-D grid coordinates based on the ETM projection for this zone.
5. Use the Bresenham's algorithm and locational code to propagate the line segment from the start point to the exit point in 3-D grid coordinates. At each propagated location P, determine the altitude $h_p$ of the LOS vector and the altitude $h_e$ of the bottom surface of the ELDETREE leaf node containing the ground track of the propagated location P.
6. If $h_e - h_p > \epsilon$, there is no intervisibility between these two locations and exit the loop. Otherwise, continue the propagation until reaching the exit point or the featured location. If the feature point is reached, exit the loop. ($\epsilon \geq 0.0$ is the altitude threshold for terrain masking.)
7. Move on to the next path segment at a neighboring zone to check intervisibility. Assign the exit point as the start location of the line segment. Then, determine the exit point of this zone based on the LOS vector in the ECEF coordinate system. Go back to Step 4.

In exemplary embodiments of the present invention, for the proposed multi-zone approach (such as described in paragraph 0027), the LOS vector between two given locations may still be computed in the ECEF coordinate system. The zone containing a starting location (ex. —the first of the two given locations) may be determined by converting its ECEF position to geodetic coordinates and comparing the geodetic coordinates of the starting location to boundaries of the zone. Remaining zones occupied by the LOS vector may be determined by tracing the LOS vector from its starting location through the entry points and exit points of each occupied zone until an ending location (ex. —the second of the two given locations) of the LOS vector is reached. Thus, the LOS vector may be broken into multiple line segments, with each line segment being in its own separate zone. Each line segment may then be examined for intervisibility with DTED in the 3-D grid coordinate system for that particular zone. Further, when all line segments of the LOS vector are determined to have intervisibility, the LOS vector is declared (ex. —determined) as having intervisibility.

Figure 8:
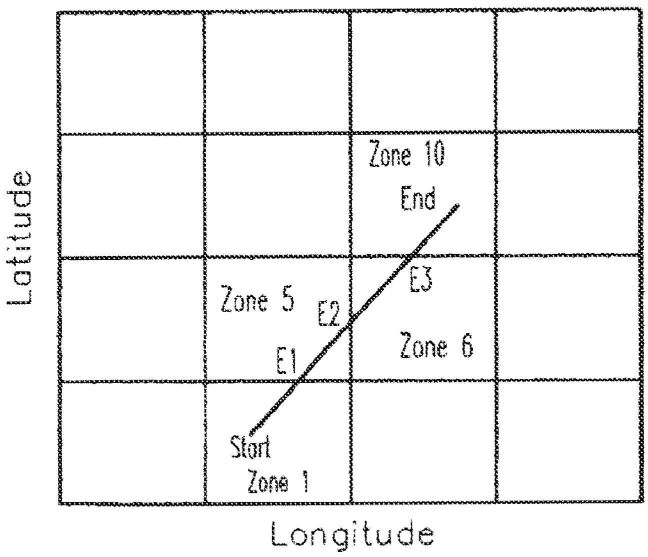
FIG. 8 is a top plan (ex. —top-down) view of a LOS vector which occupies four zones of the path planning area, has three entry/exit points, has a start location, and has an end location in accordance with an exemplary embodiment of the present invention.
Figure 9:
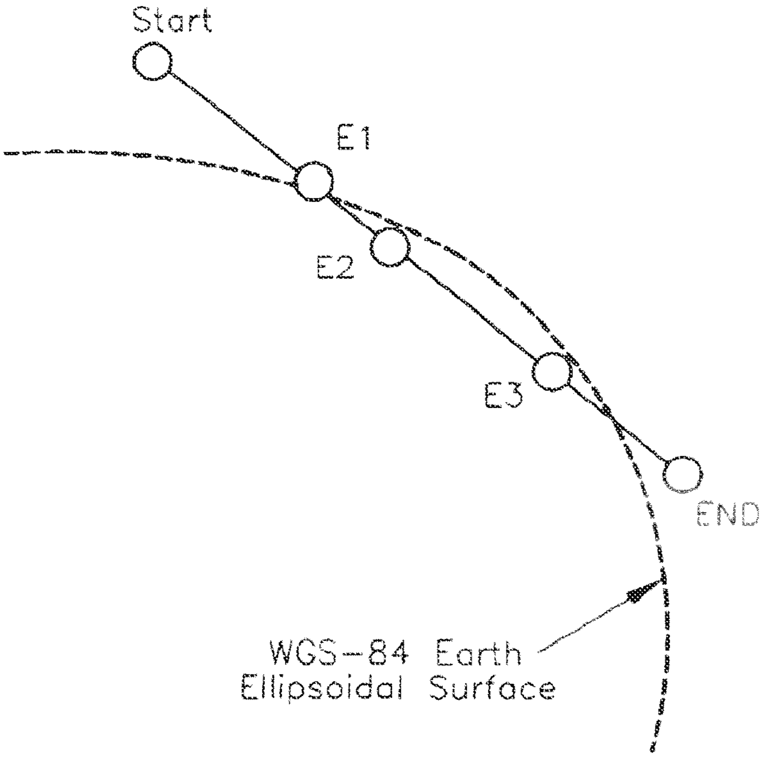
FIG. 9 illustrates a profile review which is cut along the LOS vector shown in FIG. 8 in accordance with an exemplary embodiment of the present invention.

FIG. 8 is a top plan (ex. —top-down) view of a LOS vector which occupies four zones (Zone 1, Zone 5, Zone 6, and Zone 10) of the path planning area, has three entry/exit points (E1, E2, E3), has a start location (Start) in Zone 1, and has an end location (End) in Zone 10. FIG. 9 illustrates a profile review which is cut along the LOS vector shown in FIG. 8, said LOS vector including the five anchor points (Start, End, E1, E2 and E3). In exemplary embodiments of the present invention, based upon ECEF coordinates of start location (Start), Zone 1 may be determined as containing the start location (Start). Exit point (E1) for Zone 1 may be determined by computing the intercept point between the LOS vector (ex. —the 3-D LOS vector) and the boundary of the 3-D volume of Zone 1 in the ECEF coordinate system. Because the exit point of Zone 1 and the entry point of Zone 5 are at a same location (E1), they have the same ECEF coordinates. The above process may be repeated to find entry points and exit points of the remaining occupied zones until the zone (ex. —Zone 10) containing the end location (End) of the LOS vector is reached.

In exemplary embodiments of the present invention, the LOS vector shown in FIGS. 8 and 9 is broken into four line segments, with each line segment being in its own separated zone. In further embodiments of the present invention, the line segment defined by Start and E1 in the 3-D grid coordinate system for Zone 1 may be examined for intervisibility with (ex. —based on) DTED as described above, said DTED being stored in the same 3-D grid coordinate system. Further, all of the remaining line segments (exs. —the line segment defined E1 and E2, the line segment defined by E2 and E3, and the line segment defined by E3 and End) of the LOS vector may be examined as described above for rapidly determining intervisibility of the LOS vector in a 3-D grid coordinate system. For the LOS vector shown in FIG. 9, a couple of anchor points (E2, E3) are determined as being below the ellipsoidal surface of the Earth (ex. —are below the ellipsoidal surface of the Earth model), thus, it may be very likely that intervisibility for this LOS vector does not exist.

In current exemplary embodiments of the present invention, there may be many benefits to using the multi-zone approach described above for intervisibility determination. For example, because each line segment of the LOS vector is propagated from one anchor point to another anchor point in a 3-D grid coordinate system and is compared with terrain elevation data stored in the same 3-D grid coordinate system, there is no need to perform many coordinate conversions (ex. —from ECEF coordinates to geodetic coordinates with elevations in MSL) within a zone. Further, the effect of the Earth's curvature on intervisibility determination is captured approximately through the anchor points (ex. —of the LOS vector), said anchor points being determined in ECEF coordinates, said anchor points further being converted from ECEF coordinates into their respective 3-D grid coordinates.

Currently available intervisibility determination methods may store DTED in a binary format with respect to the geodetic coordinate system, which may not be a computationally efficient format for intervisibility determination. The intervisibility determination methods of the exemplary embodiments of the present invention described herein may preprocess DTED data into an ELDETREE data structure which uses a 3-D grid coordinate system for each zone inside the planning area. Storing DTED in a 3-D grid coordinate system promotes rapid comparisons with elevations of the LOS vector (ex. —LOS line segment), said LOS vector being constructed in the same 3-D grid coordinate system. Further, the ELDETREE data structure described herein may provide a more memory-efficient format for storing terrain information, rather than storing raw DTED within application software modules.

Figure 10A:
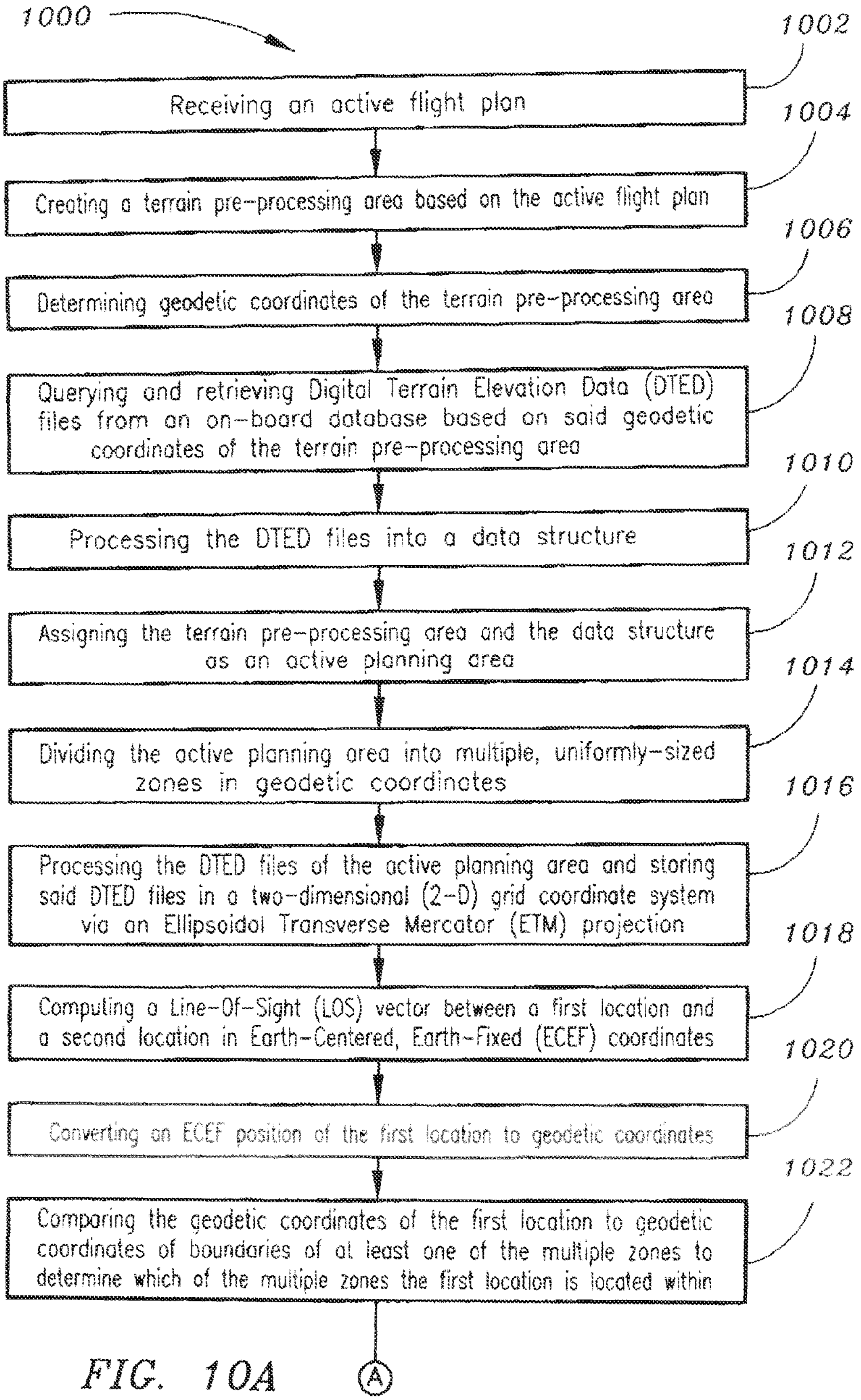
FIG. 10 is a flowchart illustrating a method for providing rapid intervisibility determination in accordance with an exemplary embodiment of the present invention.
Figure 10B:
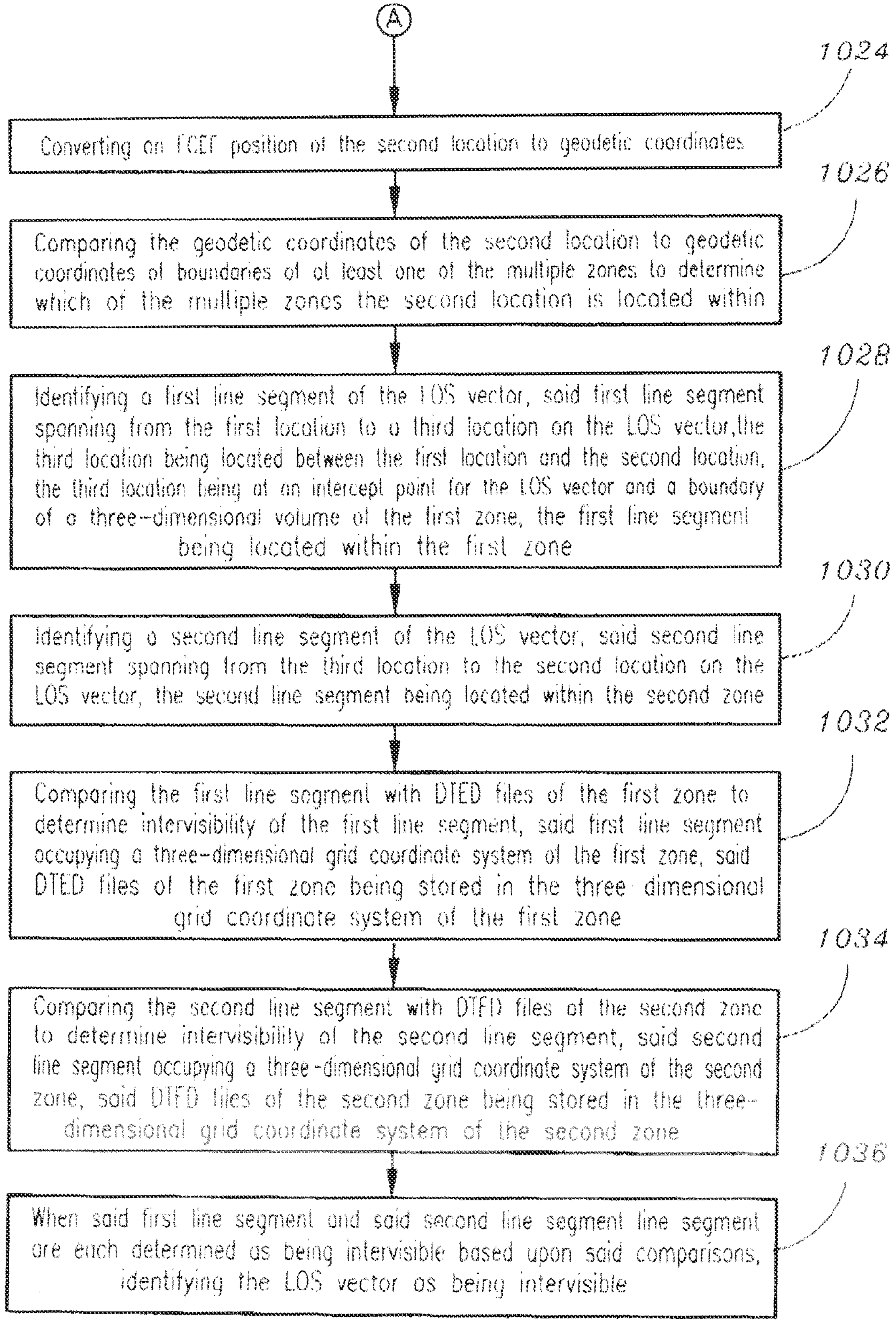

Referring to FIG. 10, a flowchart illustrating a method for providing rapid intervisibility determination in accordance with an exemplary embodiment of the present invention is shown. In exemplary embodiments of the present invention, the method 1000 may include the step of receiving an active flight plan 1002. The method 1000 may further include the step of creating a terrain pre-processing area based on the active flight plan 1004. The method 1000 may further include the step of determining geodetic coordinates of the terrain pre-processing area 1006. The method 1000 may further include the step of querying and retrieving terrain elevation data from an on-board database based on said geodetic coordinates of the terrain pre-processing area 1008. For example, the terrain elevation may be Digital Terrain Elevation Data (DTED). Alternatively, the terrain elevation data may be one of a number of various other forms of terrain elevation data. The method 1000 may further include the step of processing the DTED files into a data structure 1010. For example, the data structure may be an ELDETREE data structure.

In further embodiments, the method 1000 may further include the step of assigning the terrain pre-processing area and the data structure as an active planning area 1012. The method 1000 may further include the step of dividing the active planning area into multiple, uniformly-sized zones in geodetic coordinates 1014. The method 1000 may further include the step of processing the DTED files of the active planning area and storing said terrain elevation data (ex. —DTED files) in a two-dimensional (2-D) grid coordinate system via an Ellipsoidal Transverse Mercator (ETM) projection 1016. The method 1000 may further include the step of computing a Line-Of-Sight (LOS) vector between a first location and a second location in Earth-Centered, Earth-Fixed (ECEF) coordinates, the first location being a start location for the vector, the second location being an end location for the vector 1018. The method 1000 may further include converting an ECEF position of the first location to geodetic coordinates 1020. The method 1000 may further include comparing the geodetic coordinates of the first location to geodetic coordinates of boundaries of at least one of the multiple zones to determine which of the multiple zones the first location is located within, the zone in which the first location is determined as being located within being a first zone 1022.

In further embodiments, the method 1000 may further include the step of converting an ECEF position of the second location to geodetic coordinates 1024. The method 1000 may further include the step of comparing the geodetic coordinates of the second location to geodetic coordinates of boundaries of at least one of the multiple zones to determine which of the multiple zones the second location is located within, the zone in which the second location is determined as being located within being a second zone 1026. The method 1000 may further include the step of identifying a first line segment of the LOS vector, said first line segment spanning from the first location to a third location on the LOS vector, the third location being located on the LOS vector (ex. —being located on the first line segment of the LOS vector) the third location being located between the first location and the second location, the third location being at an intercept point for the LOS vector and a boundary of a three-dimensional volume of the first zone, the first line segment being located within the first zone 1028. The method 1000 may further include the step of identifying a second line segment of the LOS vector, said second line segment spanning from the third location to the second location on the LOS vector, the second line segment being located within the second zone 1030.

In further embodiments, the method 1000 may further include the step of comparing the first line segment with DTED files of the first zone to determine intervisibility of the first line segment, said first line segment occupying a three-dimensional grid coordinate system of the first zone, said DTED files of the first zone being stored in the three-dimensional grid coordinate system of the first zone 1032. The method 1000 may further include comparing the second line segment with DTED files of the second zone to determine intervisibility of the second line segment, said second line segment occupying a three-dimensional grid coordinate system of the second zone, said DTED files of the second zone being stored in the three-dimensional grid coordinate system of the second zone 1034. The method 1000 may further include, when said first line segment and said second line segment are each determined as being intervisible based upon said comparisons, identifying the LOS vector as being intervisible 1036.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is contemplated that the invention may take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

It is further contemplated that the medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, microphone, speakers, displays, pointing devices, cursor control devices, touch screens, and the like) may be coupled to the system either directly or through intervening I/O controllers.

Network adapters may also be coupled to the system to enable the data processing system to become coupled to other data processing systems or storage devices through intervening private or public networks. Modems, cable modem and Ethernet cards are just a few of the currently available types of network adapters.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing rapid intervisibility determination, comprising:

receiving an active flight plan via a computing system of an aircraft;

creating a terrain pre-processing area based on the active flight plan;

determining geodetic coordinates of the terrain pre-processing area;

querying and retrieving terrain elevation data from an on-board database based on said geodetic coordinates of the terrain pre-processing area;

processing the terrain elevation data into a data structure;

assigning the terrain pre-processing area and the data structure as an active planning area;

dividing the active planning area into multiple, uniformly-sized zones in geodetic coordinates;

processing the terrain elevation data of the active planning area and storing said terrain elevation data in a two-dimensional (2-D) grid coordinate system via an Ellipsoidal Transverse Mercator (ETM) projection; and computing a Line-Of-Sight (LOS) vector between a first location and a second location in Earth-Centered, Earth-Fixed (ECEF) coordinates, the first location being a start location for the vector, the second location being an end location for the vector.

2. The method as claimed in claim 1, further comprising:

converting an ECEF position of the first location to geodetic coordinates; and comparing the geodetic coordinates of the first location to geodetic coordinates of boundaries of at least one of the multiple zones to determine which of the multiple zones the first location is located within, the zone in which the first location is determined as being located within being a first zone.

3. The method as claimed in claim 2, further comprising:

converting an ECEF position of the second location to geodetic coordinates; and comparing the geodetic coordinates of the second location to geodetic coordinates of boundaries of at least one of the multiple zones to determine which of the multiple zones the second location is located within, the zone in which the second location is determined as being located within being a second zone.

4. The method as claimed in claim 3, further comprising:

identifying a first line segment of the LOS vector, said first line segment spanning from the first location to a third location on the LOS vector, the third location being located on the first line segment, the third location being located between the first location and the second location, the third location being at an intercept point for the LOS vector and a boundary of a three-dimensional volume of the first zone, the first line segment being located within the first zone.

5. The method as claimed in claim 4, further comprising:

identifying a second line segment of the LOS vector, said second line segment spanning from the third location to the second location on the LOS vector, the second line segment being located within the second zone.

6. The method as claimed in claim 5, further comprising:

comparing the first line segment with terrain elevation data of the first zone to determine intervisibility of the first line segment, said first line segment occupying a three-dimensional grid coordinate system of the first zone, said terrain elevation data of the first zone being stored in the three-dimensional grid coordinate system of the first zone.

7. The method as claimed in claim 6, further comprising:

comparing the second line segment with terrain elevation data of the second zone to determine intervisibility of the second line segment, said second line segment occupying a three-dimensional grid coordinate system of the second zone, said terrain elevation data of the second zone being stored in the three-dimensional grid coordinate system of the second zone.

8. The method as claimed in claim 7, further comprising:

when said first line segment and said second line segment are each determined as being intervisible based upon said comparisons, identifying the LOS vector as being intervisible.

9. A computer program product, comprising:

a non-transitory signal-bearing medium bearing one or more instructions for performing a method for providing rapid intervisibility determination, said method comprising:

receiving an active flight plan;

creating a terrain pre-processing area based on the active flight plan;

determining geodetic coordinates of the terrain pre-processing area;

querying and retrieving terrain elevation data from an on-board database based on said geodetic coordinates of the terrain pre-processing area;

processing the terrain elevation data into a data structure;

assigning the terrain pre-processing area and the data structure as an active planning area;

dividing the active planning area into multiple, uniformly-sized zones in geodetic coordinates;

processing the terrain elevation data of the active planning area and storing said terrain elevation data in a two-dimensional (2-D) grid coordinate system via an Ellipsoidal Transverse Mercator (ETM) projection; and computing a Line-Of-Sight (LOS) vector between a first location and a second location in Earth-Centered, Earth-Fixed (ECEF) coordinates, the first location being a start location for the vector, the second location being an end location for the vector.

10. The computer program product as claimed in claim 9, said method further comprising:

converting an ECEF position of the first location to geodetic coordinates;

comparing the geodetic coordinates of the first location to geodetic coordinates of boundaries of at least one of the multiple zones to determine which of the multiple zones the first location is located within, the zone in which the first location is determined as being located within being a first zone.

converting an ECEF position of the second location to geodetic coordinates; and comparing the geodetic coordinates of the second location to geodetic coordinates of boundaries of at least one of the multiple zones to determine which of the multiple zones the second location is located within, the zone in which the second location is determined as being located within being a second zone.

11. The computer program product as claimed in claim 10, said method further comprising:

identifying a first line segment of the LOS vector, said first line segment spanning from the first location to a third location on the LOS vector, the third location being located on the first line segment, the third location being located between the first location and the second location, the third location being at an intercept point for the LOS vector and a boundary of a three-dimensional volume of the first zone, the first line segment being located within the first zone;

identifying a second line segment of the LOS vector, said second line segment spanning from the third location to the second location on the LOS vector, the second line segment being located within the second zone;

comparing the first line segment with terrain elevation data of the first zone to determine intervisibility of the first line segment, said first line segment occupying a three-dimensional grid coordinate system of the first zone, said terrain elevation data of the first zone being stored in the three-dimensional grid coordinate system of the first zone;

comparing the second line segment with terrain elevation data of the second zone to determine intervisibility of the second line segment, said second line segment occupying a three-dimensional grid coordinate system of the second zone, said terrain elevation data of the second zone being stored in the three-dimensional grid coordinate system of the second zone; and when said first line segment and said second line segment are each determined as being intervisible based upon said comparisons, identifying the LOS vector as being intervisible.

12. A method for providing rapid intervisibility determination, comprising:

receiving an active flight plan via a computing system of an aircraft;

creating a terrain pre-processing area based on the active flight plan;

determining geodetic coordinates of the terrain pre-processing area;

querying and retrieving Digital Terrain Elevation Data (DTED) files from an on-board database based on said geodetic coordinates of the terrain preprocessing area;

processing the DTED files into a data structure;

assigning the terrain pre-processing area and the data structure as an active planning area;

dividing the active planning area into multiple, uniformly-sized zones in geodetic coordinates;

processing the DTED files of the active planning area and storing said DTED files in a two-dimensional (2-D) grid coordinate system via an Ellipsoidal Transverse Mercator (ETM) projection; and computing a Line-Of-Sight (LOS) vector between a first location and a second location in Earth-Centered, Earth-Fixed (ECEF) coordinates, the first location being a start location for the vector, the second location being an end location for the vector.

13. The method as claimed in claim 12, further comprising:

converting an ECEF position of the first location to geodetic coordinates;

comparing the geodetic coordinates of the first location to geodetic coordinates of boundaries of at least one of the multiple zones to determine which of the multiple zones the first location is located within, the zone in which the first location is determined as being located within being a first zone;

converting an ECEF position of the second location to geodetic coordinates;

comparing the geodetic coordinates of the second location to geodetic coordinates of boundaries of at least one of the multiple zones to determine which of the multiple zones the second location is located within, the zone in which the second location is determined as being located within being a second zone;

identifying a first line segment of the LOS vector, said first line segment spanning from the first location to a third location on the LOS vector, the third location being located on the first line segment the third location being located between the first location and the second location, the third location being at an intercept point for the LOS vector and a boundary of a three-dimensional volume of the first zone, the first line segment being located within the first zone;

identifying a second line segment of the LOS vector, said second line segment spanning from the third location to the second location on the LOS vector, the second line segment being located within the second zone;

comparing the first line segment with DTED files of the first zone to determine intervisibility of the first line segment, said first line segment occupying a three-dimensional grid coordinate system of the first zone, said DTED files of the first zone being stored in the three-dimensional grid coordinate system of the first zone;

comparing the second line segment with DTED files of the second zone to determine intervisibility of the second line segment, said second line segment occupying a three-dimensional grid coordinate system of the second zone, said DTED files of the second zone being stored in the three-dimensional grid coordinate system of the second zone; and when said first line segment and said second line segment are each determined as being intervisible based upon said comparisons, identifying the LOS vector as being intervisible.

* * * * *